(12) United States Patent
Kono et al.

(10) Patent No.: US 6,235,432 B1
(45) Date of Patent: *May 22, 2001

(54) THIN NON-PROTONIC ELECTROLYTIC FILM, IMMOBILIZED LIQUID-FILM CONDUCTOR, AND POLYMER CELL

(75) Inventors: Koichi Kono; Kotaro Takita; Norimitsu Kaimai, all of Kawasaki (JP)

(73) Assignee: Tonen Chemical Company, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/117,994

(22) PCT Filed: Dec. 11, 1997

(86) PCT No.: PCT/JP97/04561

§ 371 Date: Aug. 11, 1998

§ 102(e) Date: Aug. 11, 1998

(87) PCT Pub. No.: WO98/26429

PCT Pub. Date: Jun. 18, 1998

(30) Foreign Application Priority Data

Dec. 11, 1996 (JP) .................................................. 8-351903
Jan. 9, 1997 (JP) .................................................. 9-013300
Mar. 31, 1997 (JP) .................................................. 9-096436

(51) Int. Cl.$^7$ ...................................................... H01M 6/14

(52) U.S. Cl. .......................... 429/303; 429/300; 429/304; 429/306; 429/322; 429/324; 429/231.95; 429/249; 429/250; 29/623.5

(58) Field of Search ...................................... 429/300, 303, 429/304, 306, 322, 324, 249, 250, 231.95; 29/623.5

(56) References Cited

U.S. PATENT DOCUMENTS

| | | | | |
|---|---|---|---|---|
| 4,468,441 | * | 8/1984 | D'Agostino et al. ................ | 429/105 |
| 4,849,311 | * | 7/1989 | Itoh et al. ............................ | 429/192 |
| 5,270,137 | * | 12/1993 | Kubota ................................ | 429/249 |
| 5,591,542 | * | 1/1997 | Sakamoto et al. ................... | 429/192 |
| 5,830,604 | * | 11/1998 | Singleton et al. ................... | 429/254 |

* cited by examiner

*Primary Examiner*—Stephen Kalafut
*Assistant Examiner*—Angela J. Martin
(74) *Attorney, Agent, or Firm*—Venable; Marina Schneller; Keith G. Haddaway

(57) ABSTRACT

The thin film of non-protonic electrolyte comprises the microporous polyolefin film impregnated with an immobilized non-protonic electrolytic solution, where the film is treated to have improved affinity for the non-protonic solution by graft polymerization of the film with a monomer which can dissolve the non-protonic electrolytic solution, coating of the film with terminal-modified polypropylene which can dissolve the non-protonic electrolytic solution or coating of the film with wax which can dissolve the non-protonic electrolytic solution. The electrolyte-immobilized liquid-film conductor comprises the microporous polyolefin film impregnated with an immobilized non-protonic electrolytic solution, where the film contains an electron-conductive substance and is treated to have improved affinity for the non-protonic solution. The thin film of non-protonic electrolyte comprising the microporous polyolefin film gives a polymer battery, such as lithium battery, when combined with an anode and cathode. The polymer battery comprising the thin film of non-protonic electrolyte and the electrolyte-immobilized liquid-film conductor which is used at least one of the anode and cathode is advantageous over the conventional lithium battery of polymer electrolyte in various aspects, such as higher discharging function at low temperature, lesser self-discharge at high temperature, and higher charge/discharge characteristics over extended periods.

25 Claims, No Drawings

THIN NON-PROTONIC ELECTROLYTIC FILM, IMMOBILIZED LIQUID-FILM CONDUCTOR, AND POLYMER CELL

TECHNICAL FIELD

This invention relates to a thin film of non-protonic electrolyte, electrolyte-immobilized liquid-film conductor and polymer battery, and, more particularly, the thin film of essentially solid, non-protonic electrolyte in which the non-protonic electrolytic solution is selectively swollen and immobilized in the microporous polyolefin film, the electrolyte-immobilized liquid-film conductor of high electron conductivity in which an ionic conductor is immobilized in the microporous polyolefin film, and the polymer battery with the thin film of non-protonic electrolyte as the electrolyte and the electrolyte-immobilized liquid-film conductor used for at least one of the anode and cathode.

BACKGROUND OF THE INVENTION

Functions of portable electronic devices, such as cellular phones and information terminals, largely depend on those of built-in devices, which include not only semiconductors and electronic circuits but also rechargeable secondary batteries. Therefore, the built-in battery is increasingly demanded to be higher in capacity, lighter and smaller simultaneously.

The batteries of lead or nickel-cadmium, which have been used for the above purposes, are difficult to be still lighter and smaller, because of their insufficient energy density. As a result, the nickel-metal hydride battery having an energy density twice as high as that of nickel-cadmium battery and the lithium ion battery having a still higher energy density than the nickel-metal hydride battery have been developed and attracting attention.

The lithium battery is a battery of non-aqueous solution or solid electrolyte having a high energy density, and has been commercialized as the back-up power source for semiconductor memories of small electrical current and also as the power source for watches and cameras. For the battery to have wider applicable areas, such as driving and power storage, it should be further developed to a super thin lithium secondary battery which is lighter, more diversified in shape and more flexible.

However, there are many problems to be solved to improve functions and safety of the secondary battery. These problems include short circuit and ignition resulting from formation of dendrite in the lithium battery. Discovery of an electrolyte having a longer charge/discharge cycle life is one of the themes to improve reliability of the battery.

The electrolytic solution of the lithium battery is required to show ion conductivity and, at the same time, low electron conductivity to prevent short circuit and accidental discharge resulting from electrons conducted between the anode and cathode. The solid electrolyte has advantages of suffering no liquid leakage, and simplified schemes for thin film making and increasing area.

The electrolytic solution for the conventional batteries may be replaced for the battery of solid polymer electrolyte. In particular, for development of super thin film battery, which is referred to as paper battery, and electrochemical devices having a large area, such as electrochromic devices, it is necessary to develop solid polymer electrolytes for easiness of assembling and stability over extended periods.

In particular, the lithium secondary battery of solid polymer electrolyte has been attracting much attention, because of its various advantages, such as no formation of dendrite which may cause damages resulting from short circuit and ignition, no leakage of liquid unlike the case of a solution type secondary battery, and particularly ability of being made into a thin film and large area.

Some of the conventional solid polymer type solid electrolytes use a lithium salt such as $LiClO_4$ dissolved and dispersed in a polymer, such as polyether including polyethylene oxide and polypropylene oxide, polyester, polyimide and polyether derivatives. Such an electrolyte, however, needs a sufficiently higher temperature above room temperature to exhibit its ionic conductivity of $10^{-5}$ to $10^{-3}$ S/cm.

Therefore, solidified liquid electrolytes for polymer batteries have been attracting attention, in particular those of gelled polymers with matrices impregnated with a solution similar to that for the conventional solution type lithium battery with respect to salt and solvent that dissolves it. These electrolytes include cross-linked polyalkylene oxide as disclosed by U.S. Pat. No. 4,303,748 and gelled polyacrylate as disclosed by U.S. Pat. No. 4,830,939. More recently, the technique has been developed to produce the electrolyte of polymer gel which is impregnated with a polycarbonate solution with a lithium salt dissolved in a copolymer of polyvinylidene fluoride and hexafluoropropylene, as disclosed by U.S. Pat. No. 5,296,318. These electrolytes, however, have still problems of solvent maintainability, because the electrolytic solution may ooze out at high temperature as a result of gel shrinkage.

For the conductor, a thin-film conductor (porous conducting film) having a high conductivity in spite of its high porosity can be effectively used as the electrode or as a material for the electrode of the device which involves a solid polymer or liquid electrolyte. Its high porosity provides it with a large contact interface between the electrode and electrolyte, making it suitable for primary and secondary lithium batteries of high functions.

Japanese Patent Laid-Open No.3-87096 discloses a porous conductive film and production thereof, where an electrolytic solution is immobilized by capillary condensation force on the porous thin film produced from a plasticizer solution of polyethylene mixed with Ketjen black (trade name of Akzo Chemie), which is molded into sheet, drawn and treated to remove the plasticizer. However, the problems associated with maintainability of electrolytic solution are not completely solved by this technique. More recently, the new technique has been developed to use polymer gel for the anode and cathode of the battery, where the polymer gel is impregnated with a polycarbonate solution with $LiMn_2O_4$ and carbon black or petroleum coke and carbon black dissolved in a copolymer of polyvinylidene fluoride and hexafluoropropylene, as disclosed by U.S. Pat. No. 5,296,318. These electrolytes, however, have still problems of solvent maintainability, because the electrolytic solution may ooze out at high temperature as a result of gel shrinkage. Therefore, thin-film conductors which can be easily produced to have a large area and exhibit stable maintainability of the electrolytic solution over a wide temperature range are increasingly demanded.

The thin film has another advantage of reduced effective resistance. Japanese Patent Laid-Open No. 1-158051 discloses a technique to immobilize a liquid ion conductor using capillary condensation in the fine pores of 0.1 $\mu$m or less in size in the thin, porous film of solid polymer having a thickness of 50 $\mu$m or less. However, this technique by itself cannot drastically solve the problems associated with operational temperature.

It is an object of the present invention to solve the above problems, and to provide a thin film of non-protonic electrolyte which is easily produced into thin film and to have a large area, holds the solvent for the non-protonic electrolytic solution over a wide temperature range, works stably over extended periods and has improved mechanical strength; an electrolyte-immobilized liquid-film conductor; and a polymeric battery in which at least one of the thin film of non-protonic electrolyte and electrolyte-immobilized liquid-film conductor is used.

DISCLOSURE OF THE INVENTION

The present invention provides a thin film of non-protonic electrolyte in which a microporous polyolefin film is impregnated with an immobilized non-protonic electrolytic solution. The film is treated in advance to have improved affinity for the non-protonic solution. The applicable treatment methods include graft polymerization of the polyolefin film with a monomer which can dissolve the non-protonic electrolytic; coating of the film with terminal-modified polypropylene which can dissolve the non-protonic electrolytic solution; and coating of the film with wax which can dissolve the non-protonic electrolytic solution. The porous polyolefin film can be made from a polyolefin composition containing terminal-modified polypropylene or wax.

The present invention also provides an electrolyte-immobilized liquid-film conductor in which a microporous polyolefin film is impregnated with an immobilized non-protonic electrolytic solution, the film containing an electron-conductive substance and being treated in advance to have improved affinity for the non-protonic solution.

The present invention also provides a polymer battery with the thin film as the non-protonic electrolyte, and also with the anode and cathode, where at least one of the anode and cathode uses the electrolyte-immobilized liquid film conductor of microporous polyolefin film containing an electron-conductive substance.

PREFERREED EMBODIMENTS OF THE INVENTION

The present invention is described in more detail.
A. Thin Film of Non-Protonic Electrolyte The thin film of non-protonic electrolyte of the present invention has a microporous polyolefin film as the basic component, where a non-protonic electrolytic solution is immobilized in the polyolefin film containing a substance which makes the film affinitive for the non-protonic electrolytic solution. The methods to produce the porous polyolefin film containing a substance affinitive for the non-protonic electrolytic solution include graft polymerization of a monomer which can dissolve the non-protonic electrolytic solution with the polyolefin film; making the film from a composition of polyolefin mixed with a substance having affinity for the non-protonic electrolytic solution, coating of the film with a substance having affinity for the non-protonic electrolytic solution, the thin, porous polyolefin film thus produced being impregnated with the immobilized non-protonic electrolytic solution. Production of the thin film is described more concretely:
1. The Microporous Polyolefin Film
a. Polyolefin Polyolefines useful for the present invention include polyethylene, polypropylene, copolymer of ethylene and propylene, polybutene-1, poly-4-methylpentene-1, of which polyethylene is more preferable. Polyethylene useful for the present invention includes ultra-high-molecular-weight polyethylene, high-density polyethylene, and medium- and low-density polyethylene, of which ultra-high-molecular-weight polyethylene or composition that contains it is more preferable, for strength, safety and easiness of film-making.

The above polyolefin preferably contains at least 1% by weight of ultra-high-molecular-weight component having a weight-average molecular weight of $5 \times 10^5$ or higher, more preferably in a range from $1 \times 10^6$ to $1 \times 10^7$, and a molecular weight distribution (weight-average molecular weight/number-average molecular weight) of 10 to 300. The ultra-high-molecular-weight polyolefin component shows insufficient contribution to drawability of the film, when its content is lower than 1% by weight. The upper limit of the content is not limited. The molecular weight distribution above 300 is not desirable, because of possible fracture by the lower-molecular-weight component to decrease strength of the whole film.

The polyolefin may be produced by multi-stage polymerization or may be a composition of two or more types of olefin, so long as it has the above molecular weight and molecular weight distribution.

The polyolefin containing the ultra-high-molecular-weight component may contain, as required, one or more additives, such as oxidation inhibitor, ultraviolet absorber, anti-blocking agent, pigment, dye, inorganic filler and so on, to an extent that causes no damages of the objectives of the present invention.
b. Production of Microporous Polyolefin Film The microporous polyolefin film may be produced by the method disclosed by Japanese Patent Laid-Open No. 60-242035 or 3-64334. More concretely, it can be produced by a series of processes described below:

The polyolefin is dissolved in a solvent under heat, to prepare the solution. The solvents useful for the present invention include aliphatic or cyclic hydrocarbons, such as nonane, decane, decalin, p-xylene, undecane, dodecane and liquid paraffin, and mineral fractions having a corresponding boiling point.

The dissolution under heat may be effected by stirring the polyolefin in the solvent at a temperature which allows complete dissolution of the polyolefin, or by uniformly mixing them in an extruder. Temperature at which the polyolefin is dissolved in the solvent with stirring varies depending on types of polymer and solvent, but is in a range from 140 to 250° C. The polyolefin is preferably dissolved in an extruder, when the film is produced from a high-concentration solution of polyolefin.

Polyolefin content of the solution is in a range from 10 to 50% by weight, more preferably from 10 to 40% by weight, or solvent content is in a range from 90 to 50% by weight, more preferably from 90 to 60% by weight. Decreasing polyolefin content to below 10% by weight (or increasing solvent content to above 90% by weight) will cause excessive swell and neck-in of the solution at the die outlet, when it is molded into sheet, to damage sheet moldability and self-supporting property. Increasing polyolefin content to above 50% by weight (or decreasing solvent content to below 50% by weight) will damage moldability of the solution.

The polyolefin solution molten and kneaded under heat is then molded by an extruder.

The polyolefin solution is normally molded by a sheet mold with a rectangular mouth piece, but a double-cylindrical mold for production of hollow fibers and inflation mold can be also used. When a sheet mold is used, the polyolefin solution is extruded normally at 20 to 30 cm/min or 5 to 10 m/min, after being heated to 140 to 250° C., through a mold gap normally in a range from 0.1 to 5 mm.

The polyolefin solution extruded out of the mold is quenched, preferably at a rate of at least 50° C./min, into gel.

The molded gel is then drawn under heat by the conventional method, such as tenter, rolling, inflation, hot rolling or a combination thereof at a given draw ratio. Drawing may be monoaxial or biaxial, the latter being more preferable. Biaxial drawing may be effected in longitudinal and transverse directions simultaneously of sequentially.

Drawing temperature is melting point of the polyolefin +10° C., or lower, more preferably in a range from the crystal dispersion temperature to the crystal melting point. In the case of polyethylene, it is in a range from 90 to 140° C., more preferably from 100 to 130° C.

Draw ratio varies depending on sheet thickness. It is preferably 2 or higher, more preferably 3 to 30, in the case of monoaxial drawing. Area draw ratio in the case of biaxial drawing is preferably 10 or higher, more preferably 15 to 400. Drawing is insufficient at an area draw ratio below 10 to give a microporous film of high elasticity and strength, and drawing operation tends to be limited at an area draw ratio above 400.

The drawn product is washed with a solvent to remove the residual solvent. The solvents useful for washing are volatile ones, including hydrocarbons, such as pentane, hexane and heptane; chlorinated hydrocarbons, such as methylene chloride and carbon tetrachloride; fluorinated hydrocarbons, such as ethane trifluoride; and ethers, such as diethyl ether, and dioxane.

It is preferable to solidify the washed product at a temperature in a range from the crystal dispersion temperature to the crystal melting, after it is dried to remove the washing solvent.

c. Properties

The polyolefin film with fine pores is 0.1 to 100 $\mu$m thick, preferably 0.2 to 50 $\mu$m thick. Thickness of below 0.1 $\mu$m causes practical problems, such as insufficient mechanical strength and difficulty in handling, whereas thickness above 100 $\mu$m excessively increases effective resistance and decreases volumetric efficiency.

Porosity of the film is not limited, so long as it is in a range from 30 to 95%. Porosity below 30% may cause insufficient immobilization of the non-protonic electrolytic solution, whereas that above 95% is impractical, because of insufficient film strength.

Average pore size is preferably 1 $\mu$m or less. It is difficult to control diffusion of the active substances and reaction products, when average pore size exceeds 1 $\mu$m. The lower limit is not limited, but some problems may occur during the graft polymerization process, such as uneven polymerization and polymerization rate, when it is below 0.005 $\mu$m.

The microporous polyolefin film has preferably a fracture strength of 200 kg/cm$^2$ or higher. Such a film will be sufficiently resistant to deformation by swelling, when the non-protonic electrolytic solution is dissolved in the graft polymer.

2. Method to Provide Surfaces of the Microporous Polyolefin Film and its Pores with Affinity for the Non-protonic Electrolytic Solution by Graft Polymerization a. Monomers for Graft Polymerization The monomers with affinity for non-protonic electrolytic solutions include acrylic acid, methacrylic acid, acrylic acid ester, methacrylic acid ester, acrylamide, acrylonitrile, styrene and their derivatives. Acrylic acid esters include acrylic monomers, such as methyl acrylate, ethyl acrylate, butyl acrylate, isobutyl acrylate, 2-ethyl hexyl acrylate, lauryl acrylate, stearyl acrylate, ethyldecyl acrylate, ethylhexyldecyl acrylate, 2-ethoxyethyl acrylate, tetrahydrofurfuryl acrylate, trimethylolpropane triacrylate, 2-hydroxyethyl acrylate, 2-hydroxypropyl acrylate, 1,4-butadiol diacrylate, and 1,6-hexadiol diacrylate. Methacrylic acid esters include methacrylic monomers, such as methyl methacrylate, ethyl methacrylate, butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, glycidyl methacrylate and ethylene glycol dimethacrylate. They can be used either alone or in combination. Cross-linkable monomers, such as vinyl acrylate, vinyl methacrylate, divinyl benzene and butyl vinylacrylate may be used, as required. Of these, more preferable monomers are acrylic acid, methacrylic acid and their esters, and acrylic monomers such as acrylamide and its derivatives.

The monomer is selected from the above, depending on solvent type for the electrolytic solution used to produce the thin-film electrolyte. More concretely, it is selected in consideration of the Hansen parameter as one of solubility parameters. The Hansen parameter is a solubility parameter in which the effects on solubility are divided into three component, $\delta d$, $\delta p$ and $\delta h$ representing the effects by nonpolar interactions, polarization and hydrogen bonds, respectively, which are plotted in a three-dimensional coordinates (C. M. Hansen, et al., Encyclopedia of Chemical Technology, N.Y., p. 889, 1971). The parameter is investigated for many solvents. It indicates whether a solvent is good or poor for a specific polymer. For example, the Hansen parameter of a good solvent, when plotted in the three-dimensional spatial coordinates of $\delta d$, $\delta p$ and $\delta h$, is distributed in a sphere of certain size. In other words, a solvent is considered to be a good one for a specific polymer, when the positions of $\delta d$, $\delta p$ and $\delta h$ of the solvent and polymer are sufficiently close to each other in the three-dimensional coordinates.

Consider a combination of Polymer 1 and Solvent 2, distance $\gamma$ between the polymer and solvent with respect to $\delta d$, $\delta p$ and $\delta h$ is the square root of $\Delta$ given by the following formula:

$$\Delta=(\delta_{d2}-\delta_{d1})^2+(\delta_{p2}-\delta_{p2})^2+(\delta_{h2}-\delta_{h1})^2$$

wherein, $\delta_{d1}$, $\delta_{p1}$ and $\delta_{h1}$ are the Hansen parameter components of Polymer 1, and $\delta_{d2}$, $\delta_{p2}$ and $\delta_{h2}$ are those of Solvent 2 for the electrolytic solution. The Hansen parameter of Polymer 1 is determined empirically, as described earlier. Solvent 2 is considered to be a good solvent with Polymer 1, when distance $\gamma$ is within a certain level. It is known, when the Hansen parameters of various solvents are plotted to determine whether they are good or poor with Polymer 1, that the region surrounded by a good solvent is almost spherical. In other words, a solvent is considered to be a good one with Polymer 1, when its Hansen parameter falls into the hypothetical sphere (with $\delta_{d1}$, $\delta_{p1}$ and $\delta_h$ as the centers, and $\gamma$ as the radius), and to be a poor one when its parameter fall outside of the sphere. A solvent can be judged to be good or bad also from S value (representing volume fraction of the liquid or solvent in unit volume of the swollen film) determined by the adsorption test.

In the present invention, quantity of one or more monomers for graft polymerization is adjusted to the Hansen parameter of the solvent for the electrolytic solution, in order to effectively swell the solution into gel and fast immobilize it. The graft-polymerized polyolefin film selectively includes the electrolytic solution soluble in the polymer which covers the surfaces of the microporous polyolefin film and its pores. Swell of the film, however, is controlled adequately as a whole to prevent its excessive deformation and decrease in strength, because of high solvent-resistance of polyolefin as the basic material for the film.

b. Graft Polymerization

Graft polymerization of the above polymer on the surfaces of the microporous polyolefin film and its pores may be aided by plasma, electron beams or radioactive ray, such as γ ray. Graft polymerization may be post-polymerization or simultaneous polymerization, where the selected monomer is contacted the microporous polyolefin film after the radicals are formed on the film in the former, and the radicals are formed while the monomer is in contact with the film in the latter.

In one example of plasma-aided graft polymerization, the microporous polyolefin film is treated with a plasma, normally 10 to 30 MHz in frequency and 1 to 1000 W in power, for 1 to 1000 s in an atmosphere of argon, helium, nitrogen or air of $10^{-2}$ to 10 mbar in pressure. The plasma-treated film is then placed in an organic or inorganic solvent in which 1 to 10% by volume of the selected monomer is dissolved or suspended, for graft polymerization at 20 to 100° C. for 1 to 60 min with bubbling by nitrogen or argon gas. A cross-linking agent may be added, as required, to the solvent to 0.01 to 2% by volume. The adequate solvents include water, alcohol such as methanol, and aqueous alcohol solutions.

In polymerization aided by electron beams, the microporous polyolefin film, selected monomer and cross-linking agent may be together irradiated with electron beams (simultaneous irradiation), or the film may be irradiated with electron beams before being reacted with the selected monomer in the presence of cross-linking agent (pre-irradiation), the latter being more preferable because of controlled polymerization of the monomer with each other.

In polymerization in the pre-irradiation mode, the microporous polyolefin film is irradiated with electron beams at an acceleration voltage of 100 to 5000 Kev, more preferably 200 to 800 Kev. The irradiation may be effected in air.

Adequate exposure to electron beams is 10 to 500 KGy, more preferably 50 to 200 KGy. An exposure below 10 KGy may result in insufficient graft polymerization of the monomer, whereas that above 500 KGy may degrade the polyolefin film.

The microporous polyolefin film treated with electron beams is then placed in the selected monomer solution containing the cross-linking agent for graft polymerization.

The graft polymerization selectively covers the surfaces of the polyolefin film and/or its pores with the polymer. The homopolymer as the by-product of the graft polymerization may be left or washed out completely by an adequate solvent, such as toluene, leaving the graft polymer on the surfaces of the polyolefin film and/or its pores.

c. Degree of Graft Polymerization

Degree of graft polymerization can be controlled by quantity of the radicals formed, monomer concentration, monomer-radical contact time and temperature. Degree of graft polymerization, or quantity of the graft copolymer formed on unit area, is preferably in a range from 0.02 to 35 mg/cm$^2$, more preferably from 0.03 to 30 mg/cm$^2$. The effects of the electrolytic solution for dissolution and swelling may be insufficient at a degree of graft polymerization below 0.02 mg/cm$^2$, and the polyolefin film may be deformed and decrease in strength excessively at above 35 mg/cm$^2$, depending on thickness of the polyolefin film. The fine pores in the polyolefin film are gradually closed as degree of graft polymerization increases, to reduce porosity of the film, and eventually closed almost completely.

3. Method to Improve Affinity of the Microporous Polyolefin Film for the Non-protonic Electrolytic Solution with the Aid of Terminal-modified Polypropylene a. Terminal-Modified Polypropylene Terminal-modified polypropylene is polypropylene with one or more types of functional groups at its terminals. Such polypropylene includes polymer of propylene alone, and block-copolymerized rubber from propylene and one or more types of other α-olefin compounds, such as ethylene, 1-butene, 1-hexane and 4-methyl-1-pentene.

Terminal-modified polypropylene can be produced by the following procedure:

It is produced by reacting living polypropylene, a product of living polymerization of propylene, with a monomer having one or more types of functional groups over a catalyst comprising specific vanadium and organic aluminum compounds.

The preferable vanadium compounds are V(acetyl acetonate)$_3$, V(2-methyl-1,3-butanedionate)$_3$ and V(1,3-butanedionate)$_3$. The preferable organic aluminum compounds are those having a carbon number of 1 to 18, preferably 2 to 6, and mixtures and complexes thereof, such as dialkyl aluminum monohalides, monoalkyl aluminum dihalides and alkyl aluminum sesquihalides. Polymerization is preferably effected in an inert solvent which is liquid under the polymerization conditions. These solvents include saturated aliphatic, saturated alicyclic and aromatic hydrocarbons.

Quantity of the catalyst for polymerization of propylene is $1 \times 10^{-4}$ to 0.1 mols, more preferably $5 \times 10^{-4}$ to $5 \times 10^{-2}$ mols, of the vanadium compound, and $1 \times 10^{-4}$ to 0.5 mols, more preferably $1 \times 10^{-3}$ to 0.1 mols, of the organic aluminum compound for 1 mol of propylene. It is preferable to control quantity of the organic aluminum compound at 4 to 100 mols for 1 mol of the vanadium compound.

The living polymerization is normally effected at −100 to 100° C. for 0.5 to 50 h. Molecular weight of living polypropylene produced can be controlled by controlling reaction temperature and time. It is possible to produce polymer having a molecular weight distribution close to that of the monodisperse system by keeping polymerization temperature at a low level, in particular −30° C. or lower. A living polymer close to the monodisperse system, having a Mw (weight-average molecular weight)/Mn (number-average molecular weight) ratio of 1.05 to 1.40 and a number-average molecular weight of around 800 to 400,000, can be produced when temperature is decreased to −50° C. or lower.

Living polypropylene is reacted with a monomer having one or more functional groups, in order to provide the functional group structure at the terminals. A monomer similar to that for the graft polymerization is used.

Quantity of the monomer or monomers that constitute the living polymer is adjusted to the solvent for the electrolytic solution, in order to effectively swell the solution into gel and fast immobilize it. The porous thin film containing the terminal-modified living polymer selectively includes the electrolytic solution having affinity for the terminal group of the polymer which covers the surfaces of the film and its pores. Its swell, however, is controlled adequately as a whole to prevent its excessive deformation and decrease in strength, because of high solvent-resistance of polyethylene as the basic material of the film.

For the reaction between living polypropylene and the monomer containing one or more functional groups, the monomer is supplied to the reaction system containing living polypropylene. The reaction process is normally effected at −100 to 150° C. for 5 min to 50 h. Degree of modification at the polypropylene terminals by the monomer unit can be increased by increasing reaction temperature or time. In general, quantity of the monomer is set at 1 to 1000 mols for 1 mol of living polypropylene.

Terminal-modified polypropylene thus produced has a number-average molecular weight (Mn) of around 800 to 500,000, and a very narrow molecular weight distribution (Mw/Mn=1.05 to 1.40) characteristic of the living polymer itself. It also has 0.1 to 500, preferably 0.5 to 100, terminal structures of the monomer on the average at its terminals. The terminal-modified polymer has a syndiotactic diad fraction of 0.6 or higher, which is also one of its characteristics.

b. Method to Produce the Microporous Polyolefin Film Containing Terminal-modified Polypropylene The microporous polyolefin film containing terminal-modified polypropylene can be produced by (1) making the film from a composition containing terminal-modified polypropylene, or (2) by coating the polyolefine film with terminal-modified polypropylene.

The method (1) is similar to that for producing the microporous polyolefin film, described earlier.

Quantity of terminal-modified polypropylene is 1 to 50% by weight, preferably 3 to 30% by weight, of the polyolefin. It exhibits insufficient effects of impregnation and immobilization of the solvent for the electrolytic solution at below 1% by weight, and excessively degrades mechanical strength of the film at above 50% by weight.

In the method (2), the microporous polyolefin film produced by the procedure described in 1-b is coated, by impregnation, spreading or spraying, with terminal-modified polypropylene dissolved in a solvent, such as aromatic or paraffinic hydrocarbon, chloroform, or tetrahydrofuran.

4. Method to Improve Affinity of the Microporous Polyolefin Film for the Non-protonic Electrolytic Solution with the Aid of Wax a. Wax Wax showing affinity for non-protonic electrolytic solutions includes natural wax, such as vegetable, animal and mineral wax, and synthetic wax, such as synthetic hydrocarbons, modified wax, hydrogenated wax, aliphatic acid, acid amides, esters and ketones. In particular, oil- and fat-based synthetic wax has not only affinity for non-protonic electrolytic solutions but also may show the effect of promoting ion conductance after forming a complex with the lithium ions. These synthetic wax types include ester wax, where the ester is the one represented by [RCOO(CH$_2$CH$_2$)$_n$COOR], ester of monovalent alcohol and aliphatic acid represented by [RCOOR] ester of aliphatic acid and glycerol represented by [RCOOCH$_2$CH(OH)CH$_2$OH], ester of aliphatic acid and ethylene glycol represented by [RCOOCH$_2$CH$_2$OH] and ester of sorbitan and aliphatic acid.

b. Method to Produce the Microporous Polyolefin Film Containing Wax

The film of non-protonic electrolyte containing wax is produced by (1) coating the film with wax, or by (2) making the film from a wax-containing polyolefin composition.

Method (1)

The microporous polyolefin film prepared by the procedure described in 1-b is coated with wax diluted with a solvent by impregnation, spreading, spraying or a combination thereof. The suitable diluents include hydrocarbons such as pentane, hexane, heptane and toluene; chlorinated hydrocarbons such as carbon tetrachloride; ethers such as diethyl ether and dioxane; and alcohols such as methanol and ethanol.

Method (2)

Quantity of wax is 1 to 50% by weight, more preferably 3 to 30% by weight, of the total resin composition of wax and ultra-high-molecular-weight polyolefin itself or its composition with polyolefin. Impregnation and immobilization of the solvent for the electrolytic solution are insufficient at below 1% by weight, and excessive degradation of the film results at above 50% by weight. The method to produce the microporous polyolefin film from a wax-containing polyolefin composition is similar to the procedure described in 1-b.

5. Method to Immobilize the Non-protonic Electrolytic Solution in the Microporous Polyolefin Film of Improved Affinity for the Non-protonic Electrolytic Solution a. Electrolytic Solution The non-protonic electrolytic solutions useful for the present invention include alkaline metal and alkaline-earth metal salts, such as LiF, NaI, LiI, LiClO$_4$, LiAsF$_6$, LiPF$_6$, LiBF$_4$, LiCF$_3$SO$_3$, and NaSCN.

The non-protonic solvents for the non-protonic electrolytic solutions useful for the present invention are those resistant to alkaline metals and having a high dielectric constant, such as propylene carbonate, ethylene carbonate, γ-butylolactone, dimethoxyethane, acetonitrile, formamide, tetrahydrofuran and diethyl ether, either alone or in combination.

Quantity of the electrolytic solution is 70 to 350% by weight, preferably 80 to 250% by weight, of the microporous polyolefin film. Application of the film to batteries, condensers and electrochromic devices may be limited at below 70% by weight, because of insufficient interfacial areas with the electrolytic solution, and degradation of film strength may result at above 350% by weight.

b. Method for Immobilization of Electrolytic Solution

The non-protonic electrolytic solution can be immobilized in the microporous polyolefin film to produce the thin film of non-protonic electrolyte by impregnation, spreading, spraying or a combination thereof. The electrolytic solution can be immobilized before or during the film is assembled into the battery, or in the final assembling stage, the last two being more preferable viewed from handling easiness, prevention of surface wrinkling, adhesion to the anode and cathode, and applicability of the existing battery assembling line.

The thin film of non-protonic electrolyte with the electrolytic solution immobilized in the microporous polyolefin film is free from the problems resulting from liquid leakage and is made more incombustible because of much reduced vapor pressure of the solution, since the solution is immobilized by capillary phenomenon and swelling as it dissolves the graft polymer.

The immobilized electrolytic solution is similar to the solution in ion conductivity, and can be handled over a wide temperature range.

B. Electrolyte-Immobilized Liquid-Film Conductor

The electrolyte-immobilized liquid-film conductor of the present invention can be produced by immobilizing a non-protonic electrolytic solution in the microporous polyolefin film containing a substance showing affinity for electronic conductors and non-protonic electrolytic solutions. Such a polyolefin film can be produced by graft polymerization to attach a substance showing affinity for non-protonic electrolytic solutions to the microporous polyolefin film prepared from a composition containing an electron-conductive substance, by making the film from a composition of polyolefin containing an electron-conductive substance and a substance showing affinity for non-protonic electrolytic solutions, or by coating the film with a substance showing affinity for non-protonic electrolytic solutions, to immobilize the non-protonic electrolytic solution in the microporous film. These procedures, where one of the electron-conductive substances described below is mixed with polyolefin, are similar to that for the thin film of non-protonic electrolyte.

a. Electron-Conductive Substances

The electron-conductive substances useful for the present invention are a variety of metals and semiconductors, oxides and sulfides, and carbon and graphite. They may be granular, fibrous, fibril or whisker. These include anode-activating substances, such as $TiS_3$, $TiS_2$, $TiO_2$, $V_2O_5$, $NbSe_3$, $MnO_2$, $LiCoO_2$, $LiNiO_2$, $LiMn_2O_4$, $PbO_2$ and NiOOH; cathode-activating substances, such as petroleum coke, natural graphite, carbon fiber, Pb and Cd; and conductive substances, such as acetylene black, Ketjenblack (trade name of Akzo Chemicals), carbon whisker, graphite whisker and graphite fibrils.

Quantity of the electron-conductive substance is 1 to 200% by weight, more preferably 5 to 100% by weight, of polyolefin used. Conductivity is insufficient at below 1% by weight, and practically sufficient film strength may not be secured at above 200% by weight.

b. Conductivity of Electrolyte-Immobilized Liquid-Film Conductor

The electrolyte-immobilized liquid-film conductor of the present invention should have a conductivity of $10^{-5}$ S/cm or higher, more preferably $10^{-3}$ S/cm or higher. Effective resistance of the conductor is impractically high at a conductivity below $10^{-5}$ S/cm. For example, effective resistance of the 1 $\mu$m thick film is 1 $\mu$m/$10^{-5}$ C/cm, or 10 $\Omega cm^2$.

C. Polymer Battery

The thin film of non-protonic electrolyte as the gelled electrolyte can be used for the polymer battery of the present invention together with the conventional types of anode and cathode. In particular, the thin film of non-protonic electrolyte gives a safer and more economical polymer battery than the conventional one, when combined with at least one of the anode-immobilized liquid-film conductor containing an anode-activating substance as the electron-conductive substance and the cathode-immobilized liquid-film conductor containing a cathode-activating substance as the electron-conductive substance.

The conductive thin film or electrolyte-immobilized liquid-film conductor of the present invention gives, together with light, flexible electrodes, the polymer battery, in which the solvent for the electrolytic solution is immobilized by solubility of the polymer, excessive swelling is controlled by polyolefin as the structural material for the porous film, the solvent for the electrolytic solution can be held stably over a wide temperature range, evaporation of the solvent for the electrolytic solution is well controlled, and good conductivity is kept over a wide temperature range. In other words, the polymer battery has improved safety with respect to overcharge without excessively decreasing electron-conductivity.

The polymer battery of the present invention discharges electricity more efficiently than the conventional liquid-electrolyte lithium battery, because of the presence of organic electrolytic in the pores in the lithium ion conductive polymer film, which allows the lithium ions to pass not only through the electrolytic solution but also through the polymer electrolyte. Moreover, the electrolytic solution in the pores in the porous polymer electrolyte secures diffusion passages for the ions, which allows the battery to discharge electricity more efficiently than the conventional polymer-electrolyte lithium battery.

Coating the interfaces between the electrolyte and electrodes partly or totally with a porous, lithium ion conductive polymer reduces oxidation/reduction of the organic electrolytic solution by the anode and cathode, which is one of the major problems involved in high-voltage batteries, and hence improves the charge/discharge characteristics. In such a case, the lithium ion conductive polymer can secure efficient discharge.

PREFERRED EMBODIMENTS

The present invention is described more concretely by the following preferred embodiments, which by no means limit the present invention. The properties cited in the preferred embodiments were determined by the following test methods:

(1) Film thickness: Scanning electron microscopic analysis of the film sections
(2) Average pore size: Analysis by Omnisorp 360 (Nikkiso)
(3) Porosity: Analysis by weight
(4) Tensile strength: Analysis in compliance to ASTM D882

EXAMPLE 1

A microporous polyethylene film (weight-average molecular weight: $1 \times 10^6$, molecular weight distribution: 20, film thickness: 25 $\mu$m, average pore size: 0.03 $\mu$m, porosity: 43.5%, tensile strength: 1049 kg/cm$^2$) was irradiated with a plasma of 0.1 mbar and 10 W for 60 s in an argon atmosphere, and contacted a methyl acrylate solution (monomer content: 4% by volume, solvent: water) at 30° C. for 0.1, 15 and 1000 min for graft polymerization. The effluent was washed with toluene and dried at 50° C. in an oven, to prepare microporous polyethylene films (Samples A, B and C). Their degrees of graft polymerization were 0.02, 2.3 and 34 mg/cm$^2$, determined from weight changes before and after polymerization. Their tensile strength levels were 985, 995 and 190 kg/cm$^2$.

EXAMPLE 2

A microporous polyethylene film (Sample D) was prepared in the same manner as in EXAMPLE 1, except that the film was contacted a butyl acrylate emulsion (monomer content: 10% by volume, solvent: water containing sodium dodecyl benzene sulfonate) at 30° C. for 60 min for graft polymerization. It had a degree of graft polymerization of 1.5 mg/cm$^2$ and tensile strength of 940 kg/cm$^2$.

EXAMPLE 3

A microporous polyethylene film (Sample E) was prepared in the same manner as in EXAMPLE 1, except that the film was contacted a 2-ethylhexyl acrylate emulsion (monomer content: 10% by volume, solvent: water containing sodium dodecyl benzene sulfonate) at 30° C. for 30 min for graft polymerization. It had a degree of graft polymerization of 2.6 mg/cm$^2$ and tensile strength of 1035 kg/cm$^2$.

EXAMPLE 4

The microporous polyethylene films prepared by EXAMPLES 1 through 3 (Samples B, D and E), 10 cm square in size, were placed in $\gamma$-butylolactone, tetrahydrofuran and diethyl ether, kept at 25° C., for 1 h. Temporal film weight change was measured, immediately after the liquid attaching to the film was removed, for each sample to determine its weight gain by extrapolating the data to time zero. The results are given in Table 1. The temporal weight change in 1 h, relative to the weight at time zero, was also measured for each sample allowed to stand in air at 25° C. The results are given in Table 1 or 2.

Comparative Example 1

The microporous polyethylene film (the same one as in EXAMPLE 1), 10 cm square in size, was placed in γ-butylolactone, tetrahydrofuran and diethyl ether, kept at 25° C., for 1 h. Its weight gain is given in Table 1. The temporal weight change in 1 h, relative to the weight at time zero, was also measured for each sample allowed to stand in air at 25° C. The results are given in Table 2.

EXAMPLE 5

The microporous polyethylene films prepared by EXAMPLES 1 (Samples A, B and C), 10 cm square in size, were placed in γ-butylolactone containing 1% by mol of LiBF$_4$, kept at 25° C., for 1 h to prepare a thin film of non-protonic electrolyte.

Each thin film was cut into a sphere of 10 mm in diameter and sandwiched by platinum black electrodes, to measure its electrical resistance with AC (frequency: 1 kHz). Its ion conductivity was determined from the resistance level, and thickness and area of the thin film. The results are given in Table 3.

Comparative Example 2

The microporous polyethylene film (the same one as in EXAMPLE 1), 10 cm square in size, was placed in γ-butylolactone, kept at 25° C., for 1 h, to measure its electrical resistance and ion conductivity by the same procedures as in EXAMPLE 5. The results are given in Table 3.

TABLE 1

| | Weight gain extrapolated to time zero | | |
|---|---|---|---|
| | γ-butylolactone | tetrahydrofuran | diethyl ether |
| Sample B | 72% | 66% | 42% |
| Sample D | 67% | 66% | 60% |
| Sample E | 62% | 61% | 68% |
| Sample by | 49% | 38% | 31% |

Comparative Example 1

TABLE 2

| | Weight loss in 1h in air | | |
|---|---|---|---|
| | γ-butylolactone | tetrahydrofuran | diethyl ether |
| Sample B | <0.5% | <1.0% | 2.5% |
| Sample D | <0.5% | <1.0% | 1.5% |
| Sample E | <0.5% | <1.0% | 1.0% |
| Sample by | 2.5% | 37.5% | 31.0% |

Comparative Example 1

TABLE 3

| | Weight gain Extrapolated to time zero | Weight loss Oh in air | Ion conductivity |
|---|---|---|---|
| Sample A | 47% | 2.0% | 7.0 × 10$^{-3}$[S/cm] |
| Sample B | 72% | <0.5% | 7.1 × 10$^{-3}$[S/cm] |
| Sample C | 91% | <0.5% | 7.1 × 10$^{-3}$[S/cm] |
| Sample by | 49% | 2.5% | 6.8 × 10$^{-3}$[S/cm] |

Comparative Example 1

It is considered that the thin film of non-protonic electrolyte of the present invention stably holds the electrolytic solution, because it is immobilized more effectively in the microporous polyethylene film having closer Hansen parameter components; these components of the electrolytic solution solvents in the three-dimensional coordinates are (18.6, 12.2 and 14.0) [MPa$^{0.5}$] for γ-butylolactone, (13.3, 11.0 and 6.7) [MPa$^{0.5}$] for tetrahydrofuran and (13.4, 4.5 and 5.6) [MPa$^{0.5}$] for diethyl ether, and those of the microporous polyethylene films treated by graft polymerization are (13.2, 10.2 and 9.4) [MPa$^{0.5}$], (14.0, 8.3 and 6.8) [MPa$^{0.5}$] and (13.9, 6.8 and 4.5) [MPa$^{0.5}$] for those treated with methyl acrylate, butyl acrylate and 2-ethylhexyl acrylate.

EXAMPLE 6

A mixture consisting of 5% of ultra-high-molecular-weight polyethylene having a weight-average molecular weight of 2×10$^6$, 20% of high-density polyethylene having a weight-average molecular weight of 4×10$^5$, 5% of living-polymerized polypropylene having a weight-average molecular weight of 50,000 and methyl acrylate group at the terminals, and 70% of liquid paraffin having a viscosity of 64 cst at 40° C. was kneaded under heat by a batch biaxial extruder, after having been added with 0.375 parts of oxidation inhibitor on 100 parts of the polyolefin composition, where all percentages and parts are by weight.

The mixture, extruded out of the mold with a rectangular mouth piece, was rolled by a chill roll kept at 30° C. into a 0.5 mm thick sheet. The sheet was drawn in longitudinal and transverse directions simultaneously by a biaxial drawer at 115° C. and an area draw ratio of 5×5, washed with n-hexane to remove residual liquid paraffin, dried at 120° C. while it was set in the mold, and thermally set to prepare a microporous, thin film of polyethylene.

The thin film (thickness: 25 μm, porosity: 38.5%, tensile strength: 875 kg/cm$^2$), cut into a 10 cm square shape, was placed in a γ-butylolactone solution containing 1 mol % of LiBF$_4$, kept at 25° C., for 1 h to prepare the thin film of non-protonic electrolyte. Temporal film weight change was measured, immediately after the liquid attaching to the film was removed, to determine its weight gain by extrapolating the data to time zero. It was 65%. The temporal weight loss in 1 h, relative to the weight at time zero, was also measured for the film allowed to stand in air at 25° C. It was 0.5% or less.

The thin film was cut into a sphere of 10 mm in diameter and sandwiched by platinum black electrodes, to measure its electrical resistance with AC (frequency: 1 kHz). It had an ion conductivity of 7×10$^{-3}$ S/cm, as determined from the resistance level, and thickness and area of the thin film.

EXAMPLE 7

A mixture consisting of 6% of ultra-high-molecular-weight polyethylene having a weight-average molecular weight of 2.5×10⁶, 24% of high-density polyethylene having a weight-average molecular weight of 3.5×10⁵ and 70% of liquid paraffin having a viscosity of 64 cst at 40° C. was kneaded under heat by a biaxial extruder, after having been added with 0.375 parts of oxidation inhibitor on 100 parts of the polyolefin composition, where all percentages and parts are by weight.

The mixture, extruded out of the mold with a rectangular mouth piece, was rolled by a chill roll kept at 30° C. into a 0.5 mm thick sheet. The sheet was drawn in longitudinal and transverse directions simultaneously by a batch biaxial drawer at 115° C. and an area draw ratio of 5×5, washed with n-hexane to remove residual liquid paraffin, dried at 120° C. while it was set in the mold, and thermally set to prepare a microporous, thin film of polyethylene (thickness: 25 μm, porosity: 43.5%, tensile strength: 1049 kg/cm², average pore size: 0.03 μm).

The thin film was placed in a tetrahydrofuran solution containing 10% by weight of living-polymerized polypropylene with methacrylate group at the terminals for 1 h, and dried by wind for 24 h. The living polymer was added to the thin film to 14% by weight.

Then, 0.1 cc of a γ-butylolactone solution containing 1 mol % of $LiBF_4$, kept at 25° C., was added drop by drop onto the treated thin film, cut into a 10 cm square shape, and the thin film was allowed to stand in a closed vessel for 1 h to prepare the thin film of non-protonic electrolyte. Temporal film weight change was measured, immediately after the liquid attaching to the film was removed, to determine its weight gain by extrapolating the data to time zero. It was 56%. The temporal weight loss in 1 h, relative to the weight at time zero, was also measured for the film allowed to stand in air at 25° C. It was 0.5% or less.

The thin film was cut into a sphere of 10 mm in diameter and sandwiched by platinum black electrodes, to measure its electrical resistance with AC (frequency: 1 kHz). It had an ion conductivity of $7×10^{-3}$ S/cm, as determined from the resistance level, and thickness and area of the thin film.

Comparative Example 3

A microporous polyethylene film (film thickness: 25 μm, porosity: 43.5%, tensile strength: 1049 kg/cm²) was prepared in the same manner as in EXAMPLE 6 except that terminal-modified polypropylene was not used. It was cut into a 10 cm square shape, and placed in a γ-butylolactone solution containing 1 mol % of $LiBF_4$, kept at 25° C., for 1 h to prepare the thin film of non-protonic electrolyte. Temporal film weight change was measured, immediately after the liquid attaching to the film was removed, to determine its weight gain by extrapolating the data to time zero. It was 45%. The temporal weight loss in 1 h, relative to the weight at time zero, was also measured for the film allowed to stand in air at 25° C. It was 2.5%.

The thin film of non-protonic electrolyte was cut into a sphere of 10 mm in diameter and sandwiched by platinum black electrodes, to measure its electrical resistance with AC (frequency: 1 kHz). It had an ion conductivity of $7×10^{-3}$ S/cm, as determined from the resistance level, and thickness and area of the thin film.

EXAMPLE 8

A microporous polyethylene film (weight-average molecular weight: 1.1×10⁶, molecular weight distribution: 20, thickness: 25 μm, average pore size: 0.03 μm, porosity: 43.5%, tensile strength: 1049 kg/cm²) was spread with octadecyl stearate diluted with methylene chloride to 15% by weight, and was allowed to stand at room temperature for 24 h for drying, to prepare the composite film containing 49% by weight of octadecyl stearate.

A small quantity of a propylene carbonate solution containing 1 mol % of $LiPF_6$, kept at 25° C., was added drop by drop onto the coated thin film, 10 cm square in size, and the thin film was allowed to stand in a closed vessel for 1 h. The thin film of non-protonic electrolyte thus prepared had a swell (weight gain) of 98%.

The thin film was cut into a sphere of 10 mm in diameter and sandwiched by platinum black electrodes, to measure its electrical resistance with AC (frequency: 1 kHz). It had an ion conductivity of $5×10^{-3}$ S/cm, as determined from the resistance level, and thickness and area of the thin film.

EXAMPLE 9

A mixture consisting of 5 parts of octadecyl stearate, 5 parts of ultra-high-molecular-weight polyethylene having a weight-average molecular weight of 2×10⁶, 20 parts of high-density polyethylene having a weight-average molecular weight of 4×10⁵, and 70% of liquid paraffin having a viscosity of 64 cst at 40° C. was kneaded under heat by a biaxial extruder, after having been added with 0.125 parts of 2,6-di-t-butyl-p-cresol and 0.25 parts of tetrakis[methylene-3-(3,5-di-t-butyl-4-hydroxyphenyl)propionate]methane as the oxidation inhibitors on 100 parts of the mixture, where all parts are by weight. The mixture, extruded out of the mold with a rectangular mouth piece, was rolled by a chill roll kept at 30° C. into a 0.5 mm thick sheet. The sheet was drawn in longitudinal and transverse directions simultaneously by a batch biaxial drawer at 110° C. and an area draw ratio of 5×5, washed with n-hexane to remove residual liquid paraffin, dried at 115° C. while it was set in the mold, and thermally set to prepare a microporous, thin film of polyethylene containing octadecyl stearate.

The composite thin film, cut into a 10 cm square shape, was placed in a propylene carbonate solution containing 1 mol % of $LiPF_6$, kept at 25° C., for 1 h to prepare the thin film of non-protonic electrolyte. It had a swell (weight gain) of 125%.

The composite thin film was cut into a sphere of 10 mm in diameter and sandwiched by platinum black electrodes, to measure its electrical resistance with AC (frequency: 1 kHz). It had an ion conductivity of $1×10^{-2}$ S/cm, as determined from the resistance level, and thickness and area of the thin film.

EXAMPLE 10

A mixture consisting of 5 parts of ester wax (VPCSnew, trade name of HOECHST), 5 parts of ultra-high-molecular-weight polyethylene having a weight-average molecular weight of 2×10⁶, 20 parts of high-density polyethylene having a weight-average molecular weight of 4×10⁵, and 70% of liquid paraffin having a viscosity of 64 cst at 40° C. was kneaded under heat by a biaxial extruder, after having been added with 0.125 parts of 2,6-di-t-butyl-p-cresol and 0.25 parts of tetrakis[methylene-3-(3,5-di-t-butyl-4-hydroxyphenyl)propionate]methane as the oxidation inhibitors on 100 parts of the mixture, where all parts are by weight. The mixture, extruded out of the mold with a rectangular mouth piece, was rolled by a chill roll kept at 30° C. into a 0.5 mm thick sheet. The sheet was drawn in longitudinal and transverse directions simultaneously by a batch biaxial drawer at 110° C. and an area draw ratio of 5×5, washed with n-hexane to remove residual liquid paraffin, dried at 115° C. while it was set in the mold, and thermally set to prepare a microporous, thin film of polyethylene containing ester wax.

The composite thin film, cut into a 10 cm square shape, was placed in a propylene carbonate solution containing 1 mol % of $LiPF_6$, kept at 25° C., for 1 h to prepare the thin film of non-protonic electrolyte. It had a swell (weight gain) of 105%.

The composite thin film was cut into a sphere of 10 mm in diameter and sandwiched by platinum black electrodes, to measure its electrical resistance with AC (frequency: 1 kHz). It had an ion conductivity of $9 \times 10^{-3}$ S/cm, as determined from the resistance level, and thickness and area of the thin film.

Comparative Example 4

A microporous polyethylene film, prepared in the same manner as in EXAMPLE 8 except that it was not coated with octadecyl stearate, was placed in a propylene carbonate solution containing 1 mol % of $LiPF_6$, kept at 25° C., after having been cut into a 10 cm square shape, to prepare the thin film of non-protonic electrolyte. The thin film had a swell (weight gain) of 72.5%.

The thin film was cut into a sphere of 10 mm in diameter and sandwiched by platinum black electrodes, to measure its electrical resistance with AC (frequency: 1 kHz). It had an ion conductivity of $3 \times 10^{-3}$ S/cm, as determined from the resistance level, and thickness and area of the thin film.

EXAMPLE 11

A mixture consisting of 5 parts of ultra-high-molecular-weight polyethylene having a weight-average molecular weight of $2 \times 10^6$, 20 parts of high-density polyethylene having a weight-average molecular weight of $4 \times 10^5$, 5 parts of living-polymerized polypropylene having methyl acrylate group at both terminals and a weight-average molecular weight of $5 \times 10^4$, 30 parts of petroleum coke powder, 3 parts of Ketjenblack (trade name of Akzo Chemicals) powder, and 70% of liquid paraffin was kneaded under heat by a batch biaxial extruder, after having been added with 0.37 parts of an oxidation inhibitor on 100 parts of the mixture, where all parts are by weight. The mixture, extruded out of the mold with a rectangular mouth piece, was rolled by a chill roll into a 1 mm thick sheet. The sheet was drawn in longitudinal and transverse directions simultaneously by a biaxial drawer at 120° C. and an area draw ratio of 5×5, washed with n-hexane to remove residual liquid paraffin, dried at 120° C. while it was set in the mold, and thermally set to prepare a microporous, thin film of polyethylene containing the electron conductive substances and terminal-modified polypropylene.

The thin film (thickness: 25 µm) was placed in a propylene carbonate solution containing 1 mol % of $LiPF_6$, kept at 25° C., for 1 h to prepare the electrolyte-immobilized liquid-film conductor. It had a swell (weight gain) of 103%.

The conductor was cut into a sphere of 10 mm in diameter and sandwiched by platinum black electrodes, to measure its electrical resistance with AC (frequency: 1 kHz). It had a conductivity of $8 \times 10^{-2}$ S/cm, as determined from the resistance level, and thickness and area of the conductor.

EXAMPLE 12

A mixture consisting of 5 parts of ultra-high-molecular-weight polyethylene having a weight-average molecular weight of $2 \times 10^6$, 25 parts of high-density polyethylene having a weight-average molecular weight of $4 \times 10^5$, 30 parts of petroleum coke powder, 3 parts of Ketjenblack (trade name of Akzo Chemicals) powder, and 70% of liquid paraffin was kneaded under heat by a batch biaxial extruder, after having been added with 0.37 parts of an oxidation inhibitor on 100 parts of the mixture, where all parts are by weight. The mixture, extruded out of the mold with a rectangular mouth piece, was rolled by a chill roll into a 1 mm thick sheet. The sheet was drawn in longitudinal and transverse directions simultaneously by a biaxial drawer at 120° C. and an area draw ratio of 5×5, washed with n-hexane to remove residual liquid paraffin, dried at 120° C. while it was set in the mold, and thermally set to prepare a polyethylene film containing the electron conductive substances.

The film (thickness: 30 µm) was spread with living-polymerized polypropylene having a weight-average molecular weight of $5 \times 10^4$, methyl acrylate group at both terminals and diluted with methylene chloride to 15% by weight, and was allowed to stand at room temperature for 24 h for drying, to prepare the thin, microporous film of polyolefin containing 46% by weight of living-polymerized polypropylene.

Then, 0.1 cc of a propylene carbonate solution containing 1 mol % of $LiPF_6$, kept at 25° C., was added drop by drop onto the treated thin film, cut into a 10 cm square shape, and the thin film was allowed to stand in a closed vessel for 1 h to prepare the electrolyte-immobilized liquid-film conductor. It had a swell (weight gain) of 95%.

The conductor was cut into a sphere of 10 mm in diameter and sandwiched by platinum black electrodes, to measure its electrical resistance with AC (frequency: 1 kHz). It had a conductivity of $7 \times 10^{-2}$ S/cm, as determined from the resistance level, and thickness and area of the conductor.

Comparative Example 5

A microporous polyethylene film, prepared in the same manner as in EXAMPLE 12 except that it was not spread with living-polymerized polypropylene, was placed in a propylene carbonate solution containing 1 mol % of $LiPF_6$, kept at 25° C., to prepare the electrolyte-immobilized liquid-film conductor. It had a swell (weight gain) of 81.5%.

The conductor was cut into a sphere of 10 mm in diameter and sandwiched by platinum black electrodes, to measure its electrical resistance with AC (frequency: 1 kHz). It had a conductivity of $4 \times 10^{-2}$ S/cm, as determined from the resistance level, and thickness and area of the conductor.

EXAMPLE 13

Methyl acrylate was graft-polymerized with a microporous polyethylene film (weight-average molecular weight: $1 \times 10^6$, molecular weight distribution: 20, film thickness: 25 µm, porosity: 40%, tensile strength: 1049 kg/cm$^2$), where the film was irradiated with a plasma of 10 W for 60 s in an argon atmosphere at 0.1 mbar, and contacted a methyl acrylate solution (monomer content: 4% by volume, solvent: water) at 30° C. for 15 min for graft polymerization. The effluent was washed with toluene and dried at 50° C. in an oven. Its degrees of graft polymerization was 3.9 mg/cm$^2$, determined from the weight change before and after polymerization. The graft-polymerized, microporous polyethylene film, cut into a 10 cm square shape, was placed in a propylene carbonate solution containing 1 mol % of $LiPF_6$, kept at 25° C., for 1 h to prepare the thin film of non-protonic electrolyte. It had a swell (weight gain) of 134%.

A mixture consisting of 10% of polyethylene having a weight-average molecular weight of $4.0 \times 10^5$, 2 parts of polyethylene having a weight-average molecular weight of 2.0×10$^6$, 15 parts of petroleum coke powder, 3 parts of Ketjenblack powder, and 70% of liquid paraffin was kneaded under heat by a biaxial extruder, after having been added with 0.37 parts of an oxidation inhibitor on 100 parts of the mixture, where all parts are by weight. The mixture, extruded out of the mold with a rectangular mouth piece, was rolled by a chill roll into a 1 mm thick sheet. The sheet was drawn in longitudinal and transverse directions simultaneously by a batch biaxial drawer at 120° C. and an area draw ratio of 5×5, washed with n-hexane to remove residual liquid paraffin, dried at 120° C. while it was set in the mold, and thermally set to prepare a polyethylene film containing the electron conductive substances.

Methyl acrylate was graft-polymerized with the polyethylene film containing the electron conductive substances (film thickness: 30 $\mu$m), where the film was irradiated with a plasma of 10 W for 60 s in an argon atmosphere at 0.1 mbar, and contacted a methyl acrylate solution (monomer content: 4% by volume, solvent: water) at 30° C. for 15 min for graft polymerization. The effluent was washed with toluene and dried at 50° C. in an oven, to produce the graft-polymerized polyethylene film containing the electron conductive substances. Its degrees of graft polymerization was 2.5 mg/cm$^2$, determined from the weight change before and after polymerization. The graft-polymerized, microporous polyethylene film was placed in a propylene carbonate solution containing 1 mol % of LiPF$_6$, kept at 25° C., for 1 h to prepare the cathode-immobilized liquid-film conductor. It had a swell (weight gain) of 126%.

Similarly, a mixture consisting of 10% of polyethylene having a weight-average molecular weight of 4.0×10$^5$, 2 parts of polyethylene having a weight-average molecular weight of 2.0×10$^6$, 15 parts of LiMn$_2$O$_5$, 3 parts of Ketjen powder, and 70% of liquid paraffin was kneaded under heat by a biaxial extruder, after having been added with 0.37 parts of an oxidation inhibitor on 100 parts of the mixture, where all parts are by weight. The mixture, extruded out of the mold with a rectangular mouth piece, was rolled by a chill roll into a 1 mm thick sheet. The sheet was drawn in longitudinal and transverse directions simultaneously by a batch biaxial drawer at 120° C. and an area draw ratio of 5×5, washed with n-hexane to remove residual liquid paraffin, dried at 120° C. while it was set in the mold, and thermally set to prepare a polyethylene film containing the electron conductive substances. Methyl acrylate was graft-polymerized with the polyethylene film containing the electron conductive substances (film thickness: 30 $\mu$m), where the film was irradiated with a plasma of 10 W for 60 s in an argon atmosphere at 0.1 mbar, and contacted a methyl acrylate solution (monomer content: 4% by volume, solvent: water) at 30° C. for 15 min for graft polymerization. The effluent was washed with toluene and dried at 50° C. in an oven, to produce the graft-polymerized polyethylene film containing the electron conductive substances. Its degrees of graft polymerization was 3.1 mg/cm$^2$, determined from the weight change before and after polymerization. The graft-polymerized, microporous polyethylene film was placed in a propylene carbonate solution containing 1M of LiPF$_6$, kept at 25° C., for 1 h to prepare the anode-immobilized liquid-film conductor. It had a swell (weight gain) of 126%.

The thin film of non-protonic electrolyte (thickness: 49 $\mu$m, 42 by 33 mm) was placed between the cathode-immobilized liquid-film conductor (thickness: 57 $\mu$m, 40 by 30 mm) and the anode-immobilized liquid-film conductor (thickness: 51 $\mu$m, 40 by 30 mm). The laminated body was sandwiched by metallic plates, and its ends were sealed. The assembly thus prepared had a capacity of around 400 mAh at a discharge of 2 mA. No degradation in capacity was observed during 50 charge/discharge cycles.

Industrial Applicability

The thin film of non-protonic electrolyte of the present invention uses a graft-polymerized microporous polyolefin film as the substrate, and well dissolves and holds the solvent for the electrolyte. The thin film shows particularly high mechanical strength and durability, when a ultra-high-molecular-weight polyethylene is used as one of the polyethylene components. The graft polymer closes the fine pores of the microporous polyolefin film, at least partly and essentially totally, and the film can selectively include and immobilize the solvent for the electrolyte which has affinity for the graft polymer.

The microporous thin olefin film containing living polypropylene with functional groups at the terminals and that containing wax have improved affinity for the electrolytic solution to immobilize it, and are prevented from being excessively swollen, because of resistance of polyolefin as the basic material for the film to the solvent. As a result, they can stably hold the electrolytic solution and keep evaporation of the solvent at a very low level over a wide temperature range. Ionic conductivity of the film can be easily controlled for a specific purpose by properly selecting type and length of the functional group to be introduced. Therefore, it is efficiently protected from overcharge, without excessively decreasing ionic conductivity. The thin film can find wide use in the areas which need low film resistance and high mechanical strength, such as membranes for facilitated transport, electrochromic devices and sensors. It is particularly applicable to primary and secondary batteries and condensers which use non-protonic electrolytic solutions, in particular lithium-based primary and secondary batteries. It is also useful as the solid-state polymer electrolyte for lithium-based secondary batteries.

The electrolyte-immobilized liquid-film conductor of the present invention immobilizes the electrolytic solution by the action of the polymer introduced into the electrically conductive, microporous polyolefin film. It can stably hold the electrolytic solution over a wide temperature range, because it is prevented from being excessively swollen by virtue of resistance of polyolefin as the basic material for the film to the solvent, keep evaporation of the solvent at a very low level, and show good conductivity over a wide temperature range. Therefore, it is efficiently protected from overcharge, without excessively decreasing ionic conductivity. The conductor has a high mechanical strength by virtue of the skeleton of polyolefin, and can be produced by the existing battery production line, essentially without changing it. The conductor, having conductivity both for ions and electrons, can be used for electrodes for various devices, such as batteries of liquid-state electrolytes, electrochromic devices, electrical double layer condensers and liquid crystal devices, and also for devices, such as antistatic devices, electromagnetic wave shielding devices, electrically conductive paints, adhesives, IC packing materials, heating sheets, and primary and secondary batteries of planar switches.

The polymer battery of the present invention allows the lithium ions to pass not only through the electrolytic solution but also through the polymer electrolyte, thus discharging electricity more efficiently than the conventional lithium battery of liquid-state electrolyte. The electrolytic solution in the pores in the polymer electrolyte secures diffusional passages for the ions, making the polymer battery of the present invention more advantageous over the conventional lithium battery of polymer electrolyte in various aspects, such as higher discharging function at low temperature, lesser self-discharge at high temperature, and higher charge/discharge characteristics over extended periods.

Coating the interfaces between the electrolyte and electrodes partly or totally with a porous, lithium ion conductive polymer reduces oxidation/reduction of the organic electrolytic solution by the anode and cathode, which is one of the major problems involved in high-voltage batteries, and hence improves the charge/discharge characteristics.

We claim:

1. A thin film of non-protonic electrolyte, comprising a non-protonic electrolytic solution immobilized in a microporous polyolefin film having affinity for the non-protonic electrolytic solution, wherein the microporous polyolefin film comprises at least 1% by weight of a polyolefin having an average molecular weight of at least $5 \times 10^5$ and a molecular weight distribution of 10 to 300, wherein the molecular weight distribution is defined as weight average molecular weight/number average molecular weight.

2. A process for preparing a thin film of non-protonic electrolyte including steps for providing a microporous polyolefin film, introducing affinity for a non-protonic electrolytic solution in said microporous polyolefin film, and immobilizing said non-protonic electrolyte solution in said microporous polyolefin film, wherein the microporous polyolefin film comprises at least 1% by weight of a polyolefin having an average molecular weight of at least $5 \times 10^5$ and a molecular weight distribution of 10 to 300, wherein the molecular weight distribution is defined as weight average molecular weight/number average molecular weight.

3. The thin film of non-protonic electrolyte of claim 1 wherein said affinity of said microporous polyolefin film is introduced by graft polymerization of said microporous polyolefin film with a monomer selected from a group consisting of acrylic acid, methacrylic acid, esters thereof, and acrylamide and derivatives thereof.

4. The thin film of non-protonic electrolyte of claim 1 wherein affinity for the non-protonic electrolytic solution is introduced by adding terminal-modified polypropylene to said microporous polyolefin film.

5. The thin film of non-protonic electrolyte of claim 4 wherein affinity for the non-protonic electrolytic solution is introduced by coating said microporous polyolefin film with terminal-modified polypropylene.

6. The thin film of non-protonic electrolyte of claim 4 wherein said microporous polyolefin film in which affinity for the non-protonic electrolytic solution is introduced comprises a polyolefin composition containing terminal-modified polypropylene.

7. The thin film of non-protonic electrolyte of claim 4 wherein said terminal-modified polypropylene is living-polymerized to have functional groups at the terminals.

8. The thin film of non-protonic electrolyte of claim 4 wherein said microporous polyolefin film in which affinity for the non-protonic electrolytic solution is introduced contains terminal-modified polypropylene to 1 to 50% by weight of polyolefin.

9. The thin film of non-protonic electrolyte of claim 1 wherein affinity for the non-protonic electrolytic solution is introduced by adding wax having affinity for the non-protonic electrolytic solution to said microporous polyolefin film.

10. The thin film of non-protonic electrolyte of claim 9 wherein affinity for the non-protonic electrolytic solution is introduced by coating said microporous polyolefin film with wax having affinity for the non-protonic electrolytic solution.

11. The thin film of non-protonic electrolyte of claim 9 wherein said microporous polyolefin film in which affinity for the non-protonic electrolytic solution is introduced comprises a polyolefin composition containing wax.

12. An electrolyte-immobilized liquid-film conductor, comprising a non-protonic electrolytic solution immobilized in a microporous polyolefin film having affinity for the non-protonic electrolytic solution and containing an electrically conductive substance, wherein the microporous polyolefin film comprises at least 1% by weight of a polyolefin having an average molecular weight of at least $5 \times 10^5$ and a molecular weight distribution of 10 to 300, wherein the molecular weight distribution is defined as weight average molecular weight/number average molecular weight.

13. The electrolyte-immobilized liquid-film conductor of claim 12 wherein affinity for the non-protonic electrolytic solution is introduced by graft polymerization of said microporous polyolefin film containing an electrically conductive substance with a monomer which can dissolve said non-protonic electrolytic solution.

14. The electrolyte-immobilized liquid-film conductor of claim 12 wherein affinity for the non-protonic electrolytic solution is introduced by adding terminal-modified polypropylene to said microporous polyolefin film containing an electrically conductive substance.

15. The thin film of non-protonic electrolyte of claim 14 wherein said microporous polyolefin film in which affinity for the non-protonic electrolytic solution and electrical conductivity are introduced contains terminal-modified polypropylene to 1 to 50% by weight of polyolefin.

16. A polymer battery, comprising the thin film of non-protonic electrolyte of claim 1, and an anode and cathode.

17. The polymer battery of claim 16, wherein at least one of said anode and said cathode comprises a non-protonic electrolytic solution immobilized in a microporous polyolefin film having an affinity for said non-protonic electrolytic solution and containing an electrically conductive substance.

18. The process for preparing a thin film of non-protonic electrolyte according to claim 2, wherein the affinity for the non-protonic electrolyte solution is introduced by adding terminal-modified polypropylene to said microporous polyolefin film.

19. The process for preparing a thin film of non-protonic electrolyte according to claim 2, wherein the affinity for the non-protonic electrolytic solution is introduced by coating said microporous polyolefin film with terminal-modified polypropylene.

20. The process for preparing a thin film of non-protonic electrolyte according to claim 2, wherein said microporous polyolefin film in which affinity for the non-protonic electrolytic solution is introduced comprises a polyolefin composition containing terminal-modified polypropylene.

21. The process for preparing a thin film of non-protonic electrolyte according to claim 2, wherein said terminal-modified polypropylene is living-polymerized to have functional groups at the terminals.

22. The process for preparing a thin film of non-protonic electrolyte according to claim 2, wherein said microporous polyolefin film in which affinity for the non-protonic electrolytic solution is introduced contains terminal-modified polypropylene to 1 to 50% by weight of polyolefin.

23. The process for preparing a thin film of non-protonic electrolyte according to claim 2, wherein affinity for the non-protonic electrolytic solution is introduced by adding wax having affinity for the non-protonic electrolytic solution to said microporous polyolefin film.

24. The process for preparing a thin film of non-protonic electrolyte according to claim 2, wherein affinity for the non-protonic electrolytic solution is introduced by coating said microporous polyolefin film with wax having affinity for the non-protonic electrolytic solution.

25. The process for preparing a thin film of non-protonic electrolyte according to claim 2, wherein said microporous polyolefin film in which affinity for the non-protonic electrolytic solution is introduced comprises a polyolefin composition containing wax.

* * * * *

UNITED STATES PATENT AND TRADEMARK OFFICE
CERTIFICATE OF CORRECTION

PATENT NO. : 6,235,432 B1  Page 1 of 1
DATED : May 22, 2001
INVENTOR(S) : Kono et al.

It is certified that error appears in the above-identified patent and that said Letters Patent is hereby corrected as shown below:

Title page,
Item to read as follows: -- [73] Assignee: Tonen Chemical Corporation --.

Signed and Sealed this

Nineteenth Day of February, 2002

Attest:

Attesting Officer

JAMES E. ROGAN
Director of the United States Patent and Trademark Office